(No Model.)
J. B. THOMAS.
AIR PIPE COUPLING.
No. 496,758. Patented May 2, 1893.
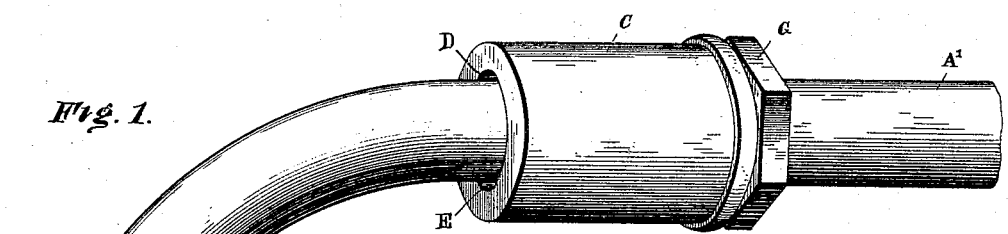
Fig. 1.
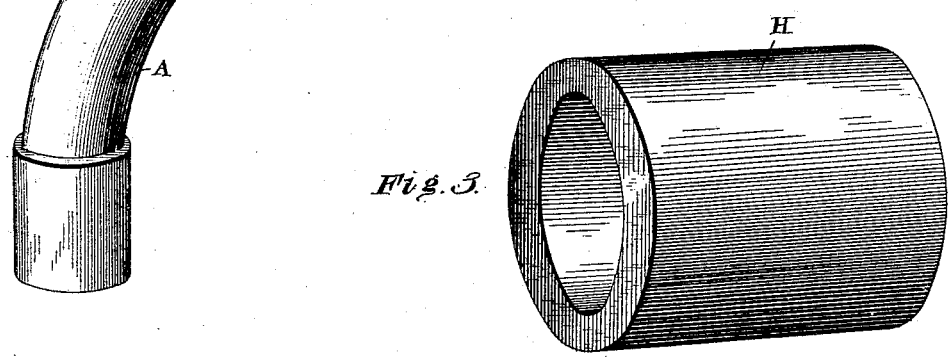
Fig. 3.
Fig. 2.
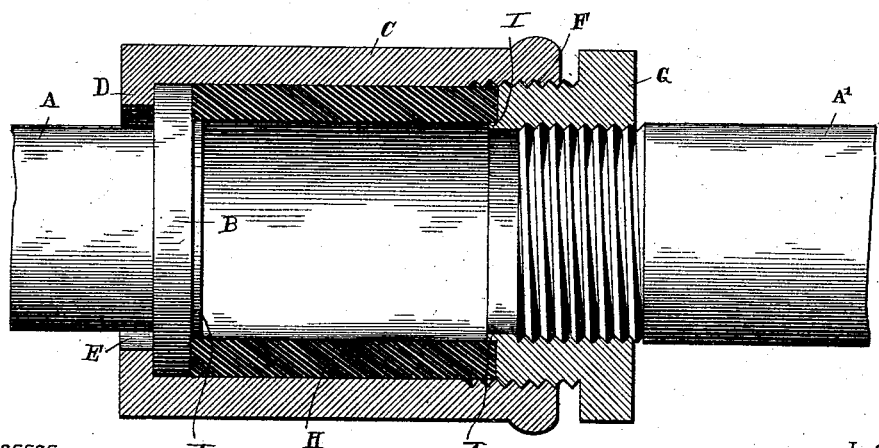
Witnesses
Inventor
James B. Thomas.
By his Attorneys,
THE NORRIS PETERS CO., PHOTO-LITHO., WASHINGTON, D. C.

UNITED STATES PATENT OFFICE.

JAMES BRYANT THOMAS, OF SULPHUR SPRINGS, TEXAS.

AIR-PIPE COUPLING.

SPECIFICATION forming part of Letters Patent No. 496,758, dated May 2, 1893.

Application filed September 30, 1892. Serial No. 447,409. (No model.)

*To all whom it may concern:*

Be it known that I, JAMES BRYANT THOMAS, a citizen of the United States, residing at Sulphur Springs, in the county of Hopkins and State of Texas, have invented a new and useful Air-Pipe Coupling, of which the following is a specification.

This invention relates to air-pipe couplings; and has for its object to provide an improvement in air brake pipe couplings, which while providing an air and water tight joint, at the same time provides a flexible union, which readily yields to the various motions of the cars.

To this end the invention primarily contemplates an improved construction of flexible pipe couplings, particularly adapted to be used in that class of combined car and air pipe couplings, wherein hose or other light flexible material, which is usually employed in air tight couplings, is dispensed with, but it will of course be understood that the flexible union or coupling can be used in other places, where torsional and angular strains are placed upon the couplings.

With these and many other objects in view, which will readily appear as the nature of the invention is better understood, the same consists of the novel construction and combination and arrangement of parts, hereinafter more fully described, illustrated and claimed.

In the accompanying drawings:—Figure 1 is a perspective view of the air-brake pipe coupling or union. Fig. 2 is a longitudinal sectional view of the same. Fig. 3 is a detail in perspective of the interposed flexible gasket.

Referring to the accompanying drawings—A represents one of the air brake pipe sections, which in the present case is illustrated as curved, so that the same can be readily connected to the combined coupling illustrated in Patent No. 418,089, granted to me December 24, 1889. The pipe section A, terminates at one end in the external flange B, and accommodates at such end the loose coupling collar or sleeve C. The said coupling collar or sleeve C, is provided at one end with the internal flange or shoulder D, which leaves an opening E, of a diameter greater than the external diameter of the pipe A, and thus permits the said collar or sleeve to freely slide over such pipe member, and also allows the same a free angular movement, while at the same time, the sleeve is held in position on the pipe by the internal shoulder or flange thereof engaging the flange at the end of the pipe section. The coupling collar or sleeve C, is interiorly threaded at the other coupling end, as at F, to engage the exteriorly and interiorly threaded nut or head G, secured stationary upon the coupling end of the other pipe section or member A'. The collar or sleeve, as illustrated, is elongated so as to snugly accommodate therein the flexible cylindrical rubber gasket or tube H, and is clamped in position therein by the coupling of said collar or sleeve to said pipe nut, so that the ends of said sleeve or gasket bear against the inner end of the nut and the flanged end of the pipe section A', thereby forming a perfectly tight joint, but owing to the loose connection of the collar or sleeve with its pipe section, a yielding movement of the union is provided.

From the construction herein described, it will be readily seen that owing to the freedom of movement allowed the collar or sleeve, and the flexibility of the interposed gasket, that a joint is provided which yields readily to the varied angular motions of the car, and thereby prevents the pipe from bending or breaking when it is subjected to such motions, as must necessarily occur in air brake couplings between two cars.

The practicability and utility of the herein-described coupling does not remain undemonstrated, but on the contrary, the coupling or union has been in every day use and subjected to a thorough test on trains plying between St. Louis, Missouri, and Madison, Illinois, and the same has satisfactorily fulfilled all requirements.

It is thought that the construction, operation and many advantages of the herein described coupling will be readily apparent, but at this point it will be well to note an additional feature fully illustrated in Fig. 2 of the drawings.

As shown, the inner face of the exterior flange B, or the flanged end of the section of piping A, and the inner end of the nut G, are provided with the inwardly projecting circular lips I, which snugly register with the inner diameter of the cylindrical gasket or tube H, and project into the opposite ends thereof, which bear against the inner end of the said nut and the flanged end of the pipe section A'. By this construction, it will be readily seen that the gasket H, is always held to its true cylindrical shape, and is effectually prevented from spreading or contracting at its ends, owing to the pressure placed thereon by the coupling collar or sleeve.

Having thus described my invention, what I claim as new, and desire to obtain by Letters Patent, is—

1. In a coupling or union for air-brake pipes, the two opposite pipe sections, one of which is provided with an external flange at one end, and the other opposite section having a stationary exteriorly threaded nut or head, at its corresponding end, an elongated coupling collar or sleeve mounted loosely over the flanged pipe section and having an internal flange at one end forming an opening of larger diameter than that of the pipe section to allow lateral or angular play therefor, and interior threads at the other end adapted to engage the nut at the end of the opposite pipe section, an elongated cylindrical flexible gasket snugly inclosed by said collar or sleeve and having its ends bearing against the ends of the opposing pipe sections and means for rigidly holding the ends of said gasket truly circular to prevent spreading or contraction thereof, substantially as set forth.

2. In a coupling or union for air brake pipes, the two opposite pipe sections, one of which is provided at one end with a flange and a circular lip projecting from the face of said flange, and the other opposite section having an exteriorly threaded head at its corresponding end and a corresponding projecting lip, a coupling collar or sleeve, loosely mounted over the flanged pipe section and having a threaded end engaging said head, and a cylindrical flexible gasket interposed between the inclosed ends of the flanged pipe and said threaded head and having its opposite ends taking over said opposite projecting lips, substantially as set forth.

In testimony that I claim the foregoing as my own I have hereto affixed my signature in the presence of two witnesses.

JAMES BRYANT THOMAS.

Witnesses:
BENJ. J. KLENE,
J. L. SECOR.